US010743085B2

(12) United States Patent
Prabhu et al.

(10) Patent No.: US 10,743,085 B2
(45) Date of Patent: Aug. 11, 2020

(54) AUTOMATIC ANNOTATION OF AUDIO-VIDEO SEQUENCES

(71) Applicant: Microsoft Technology Licensing, LLC, Redmond, WA (US)

(72) Inventors: Akshay Prabhu, Hyderabad (IN); Vasanth Raja Chittampally, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 15/656,807

(22) Filed: Jul. 21, 2017

(65) Prior Publication Data

US 2019/0028780 A1   Jan. 24, 2019

(51) Int. Cl.
*H04N 21/81* (2011.01)
*G06K 9/00* (2006.01)
(Continued)

(52) U.S. Cl.
CPC ....... *H04N 21/8133* (2013.01); *G06F 16/248* (2019.01); *G06F 16/951* (2019.01);
(Continued)

(58) Field of Classification Search
CPC .................................................. G06K 9/00751
(Continued)

(56) References Cited

U.S. PATENT DOCUMENTS 9,338,493 B2   5/2016   Van Os et al.
9,456,237 B2   9/2016   Oztaskent et al.
(Continued)

FOREIGN PATENT DOCUMENTS

IN   2900MUM2013   7/2015

OTHER PUBLICATIONS

Law-To, et al., "VoxaleadNews: robust automatic segmentation of video into browsable content," In Proceedings of the 17th ACM international conference on Multimedia, Oct. 19, 2009, pp. 1119-1120.
Wactlar, Howard D., "New Directions in Video Information Extraction and Summarization," In In Proceedings of the 10th DELOS Workshop, Jun. 24, 1999, pp. 1-10.
(Continued)

*Primary Examiner* — Eileen M Adams
*Assistant Examiner* — Daniel T Tekle
(74) *Attorney, Agent, or Firm* — Klarquist Sparkman, LLP (57) ABSTRACT

In some examples, a facility augments an audio-video sequence playback display with respect to a current playback position of the audio-video sequence within a time index range of the sequence. For a first portion of the time index range of the sequence containing the current playback position ("CPP"), the facility performs automatic voice transcription against the audio component to obtain speech text for at least one speaker. For a second portion of the time index range of the sequence containing the CPP, the facility performs automatic image recognition against the video component to obtain identifying information identifying at least one person, object, or location. Simultaneously with the sequence playback display and proximate to the sequence playback display, the facility displays one or more annotations each based upon (a) at least a portion of the obtained speech text, (b) at least a portion of the obtained identifying information, or (c) both.

19 Claims, 10 Drawing Sheets

(51) Int. Cl.
*G10L 15/26* (2006.01)
*G06F 40/169* (2020.01)
*G06F 16/951* (2019.01)
*G06F 16/248* (2019.01)
*G10L 21/055* (2013.01)
*G11B 27/10* (2006.01)
*H04N 5/93* (2006.01)
*H04N 21/231* (2011.01)
*H04N 21/234* (2011.01)
*H04N 21/43* (2011.01)
*H04N 21/488* (2011.01)
*H04N 21/8547* (2011.01)
*G10L 15/24* (2013.01)

(52) U.S. Cl.
CPC ....... *G06F 40/169* (2020.01); *G06K 9/00288* (2013.01); *G06K 9/00523* (2013.01); *G06K 9/00536* (2013.01); *G06K 9/00671* (2013.01); *G06K 9/00744* (2013.01); *G10L 15/26* (2013.01); *G10L 15/265* (2013.01); *G10L 21/055* (2013.01); *G11B 27/10* (2013.01); *H04N 5/9305* (2013.01); *H04N 21/23106* (2013.01); *H04N 21/23418* (2013.01); *H04N 21/4307* (2013.01); *H04N 21/4884* (2013.01); *H04N 21/8547* (2013.01); *G10L 15/24* (2013.01)

(58) Field of Classification Search
USPC .......................................... 386/241
See application file for complete search history.

(56) References Cited

U.S. PATENT DOCUMENTS

| | | | |
|---|---|---|---|
| 2007/0101266 A1 | 5/2007 | Kim et al. | |
| 2008/0313570 A1* | 12/2008 | Shamma | G11B 27/034 715/846 |
| 2012/0304065 A1 | 11/2012 | Cai | |
| 2013/0129307 A1 | 5/2013 | Choe et al. | |
| 2013/0144876 A1 | 6/2013 | Mehanna et al. | |
| 2014/0149865 A1* | 5/2014 | Tanaka | G06F 16/70 715/719 |
| 2015/0074534 A1 | 3/2015 | Didomenico et al. | |
| 2015/0370435 A1 | 12/2015 | Kirmse et al. | |
| 2015/0373296 A1* | 12/2015 | Ushiyama | H04N 5/765 725/91 |
| 2016/0140959 A1 | 5/2016 | Connell et al. | |
| 2016/0353157 A1 | 12/2016 | Rajapandiyan et al. | |

OTHER PUBLICATIONS

Pierce, David, "Amazon's X-Ray Shows Movie Info Whenever You Hit Pause," https://www.wired.com/2015/04/amazon-xray-fire-tv/, Published on: Apr. 13, 2015, 5 pages.

"International Search Report and Written Opinion Issued in PCT Application No. PCT/US2018/034814", dated Sep. 18, 2018, 12 Pages.

* cited by examiner

| annotation caching table 600 | | |
|---|---|---|
| sequence identifier | time index | annotation information |
| oznews.net/cate.wmv | 00:02:02 | <annotation information> |
| eagersport.com/media/a334.mov | 00:00:05 | <annotation information> |
| eagersport.com/media/a334.mov | 00:00:12 | <annotation information> |
| eagersport.com/media/a334.mov | 00:00:44 | <annotation information> |
| 611 | 612 | 613 |

FIG. 10 matching sequence table — 1000

| sequence group identifier | sequence identifier | starting time index | ending time index |
|---|---|---|---|
| 1 | oznews.net/cate.wmv | | |
| 1 | seecelebs.com/cb.wmv | | |
| 2 | eagersport.com/media/a334.mov | 00:00:10 | 00:01:10 |
| 2 | clipsss.net/chipmunk.mp4 | 00:17:45 | 00:18:45 |

1001 1002 1003 1004

1011 1012 1013 1014

AUTOMATIC ANNOTATION OF AUDIO-VIDEO SEQUENCES

BACKGROUND

In an audio-video sequence, a time-indexed video sequence is synchronized with a corresponding time-indexed audio sequence. For example, in an audio-video sequence capturing a conversation between two participants, the constituent audio sequence will contain the sound of the words spoken by the participants, while the constituent video sequence will show the two participants and their visual behavior. Further, during playback of the audio-video sequence, the spoken words of the audio sequence are synchronized to occur at the same time as the facial movement of the participant speaking them.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

In some examples, the facility provides facility for augmenting an audio-video sequence playback display with respect to a current playback position of the audio-video sequence within a time index range of the audio-video sequence. The audio-video sequence as an audio component and a video component. For at least a first portion of the time index range of the audio-video sequence containing the current playback position, the facility performs automatic voice transcription against the audio component to obtain speech text for at least one speaker. For at least a second portion of the time index range of the audio-video sequence containing the current playback position, the facility performs automatic image recognition against the video component to obtain identifying information identifying at least one person, object, or location. Simultaneously with the audio-video sequence playback display and proximate to the audio-video sequence playback display, the facility causes to be displayed one or more annotations each based upon (a) at least a portion of the obtained speech text, (b) at least a portion of the obtained identifying information, or (c) at least a portion of the obtained speech text and at least a portion of the obtained identifying information.

DETAILED DESCRIPTION

The inventors have noted that watching and listening to an audio-video sequence can raise questions for an observer, such as: who people, characters, or actors included in the sequence are; what people included in the video sequence are saying; what the significance is of what people included in the video sequence are saying; what objects included in the sequence are; what the significances of objects included in the sequence; etc. The inventors further noted that, in cases in which the observer is watching and listening to the audio-video sequence in a web browser, it is common for them to open a new window or tab in the web browser, and construct and in the new window or tab submit a search query inquiring about who or what they think they saw, or what they think they heard.

The inventors recognize that conventional approach for learning more about aspects of a viewed audio-video sequence has significant disadvantages. For example, the observer may misidentify the person or object of interest, or misinterpret spoken words. Additionally, it takes significant effort to open a new browser window or tab and construct query. Further, doing so interrupts the experience of watching and listening to the audio-video sequence, and visually separates the information returned in response to the search query from the audio-video sequence.

In response to his recognition of these disadvantages of the conventional approach described above, the inventors have conceived and reduced to practice a software and/or hardware facility for automatic annotation of audio-video sequences ("the facility").

In some examples, the facility is incorporated into a web browser, such that, when an audio-video sequence ("sequence") is playing in a web browser, and/or when playback of the sequence is paused, the facility displays information relevant to the current position in the audio-video sequence. In various examples, these annotations are displayed near the video frame, and/or overlaid over the video frame.

In some examples, the annotations include text automatically transcribed from a time range in the audio sequence near the current playback position, such as the 10 seconds of the audio sequence that immediately precede the current playback position. In some examples the annotations include information obtained by performing a web search on some or all of the transcribed text.

In some examples, the annotations include the names of people automatically recognized from the sequence. In some cases, the facility recognizes people by performing an image search against frames selected from a time range in the video sequence near the current playback position, such as the 10 seconds of the video sequence that immediately precede the current playback position. In some cases, the facility recognizes people by performing speaker recognition against a time range in the audio sequence near the current playback position. In some cases, the annotations include information obtained by performing a web search on names or other identifying information of the recognized people.

In some examples, the annotations include identifications of one or more objects or geographic places automatically recognized from the sequence. In some cases, the facility recognizes objects or geographic places by performing an image search against frames selected from a time range in the video sequence near the current playback position, such as the 10 seconds of the video sequence that immediately precede the current playback position. In some cases, the facility recognizes people by performing audio searching against a time range in the audio sequence near the current playback position. In some cases, the annotations include information obtained by performing a web search on names or other identifying information of the recognized objects or geographic places.

In some examples, the facility analyzes the sequence and generates annotations in real-time or near-real-time. In some examples, the facility caches annotations across different users, centrally storing on a server annotations generated for any user for a particular sequence and time index. Before itself generating an annotation for a particular sequence and time index, a portion of the facility executing on a client determines whether annotations are already available for that sequence and time index from the server. In various examples, the facility uses identifiers of various types to identify the sequences to which each cached instance of annotations applies, including, for example, URLs, or identifiers assigned to particular sequences by a particular video streaming or download service. In some examples, when a particular sequence is accessed by a user or its playback begins, the facility checks the server for instances of annotations cached for the sequence, either for its entire time range or for a subrange. In some examples, the facility preloads some or all of the annotations determined to be cached on the server for the sequence.

In some examples, the facility analyzes different sequences to determine if they related, such as those that (a) are identical; (b) partially intersect; or (c) are different versions of the same audio and visual events, such as sequences at different bitrates produced from the same audio and video capture; separate captures by devices in the same place at the same time; etc. In such examples, the facility makes annotation instances cached for one sequence available with respect to one or more other related sequences. In various examples, the facility identifies related sequences in one or more different ways, including, for example, by directly comparing audio sequences, directly comparing video sequences, comparing hashes or other significant compressions of audio sequences and/or video sequences, etc.; comparing the annotations cached for different sequences, summaries or otherwise compressed versions of these, or intermediate results used to arrive at these; etc.

By performing in some or all of the ways described above, the facility enables users to easily access information related to the audio-video sequences they watch.

Also, by performing in some or all of the ways described, the facility meaningfully reduces the hardware resources needed to create, share, access, and display annotations to sequences, including, for example: reducing the amount of storage space needed to do so; and reducing the number of processing cycles needed to do so. This allows programs making use of the facility to execute on computer systems that have less storage and processing capacity, occupy less physical space, consume less energy, produce less heat, and are less expensive to acquire and operate. Also, such a computer system can perform annotation with less latency, producing a better user experience and allowing users to do a particular amount of augmented sequence-watching in less time.

Figure 1:
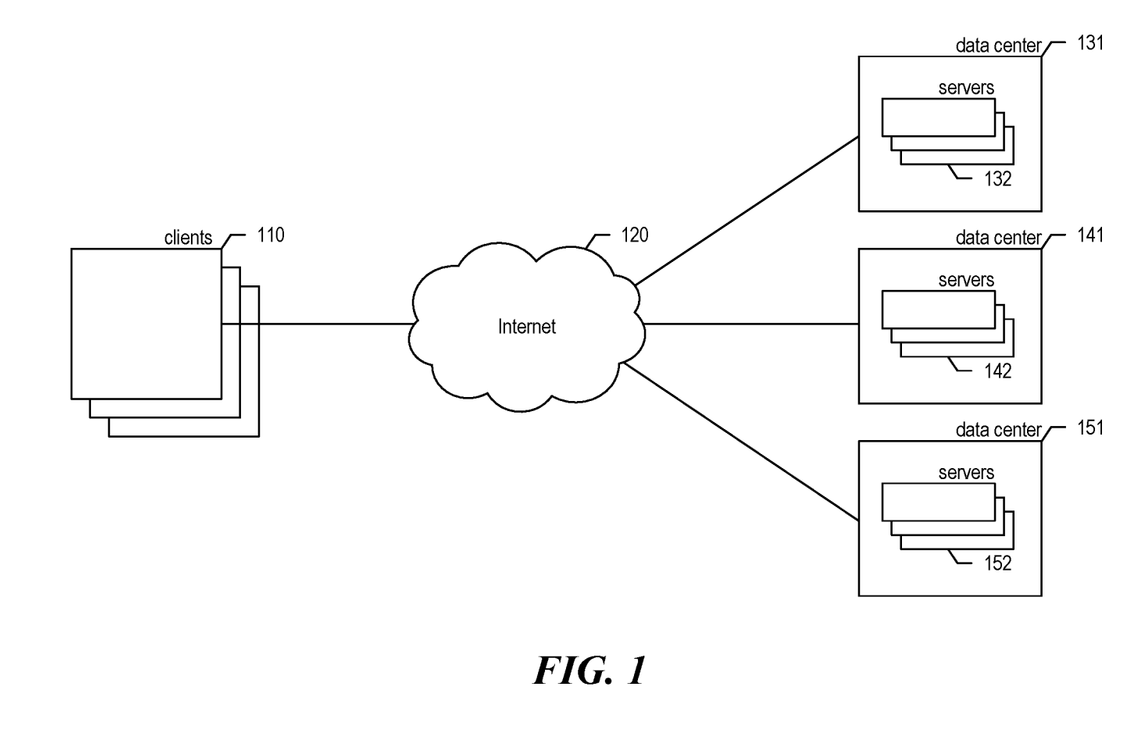
FIG. 1 is a block diagram showing some of the components typically incorporated in at least some of the computer systems and other devices on which the facility operates.

FIG. 1 is a network diagram showing the environment in which the facility operates in some examples. The network diagram shows clients 110 each typically being used by different user. Each of the clients execute software enabling its user to play back audio-video sequences, such as a browser, media player, DVR interface, etc. Portions of the facility execute on the clients to determine and display annotations relevant to a current position in the playback of a particular audio-video sequence. The clients are connected by the Internet 120 and/or one or more other networks to data centers such as data centers 131, 141, and 151, which in some examples are distributed geographically to provide disaster and outage survivability, both in terms of data integrity and in terms of continuous availability. Distributing the data center geographically also helps to minimize communications latency with clients in various geographic locations. Each of the data centers contain servers, such as servers 132, 142, and 152. Each server can perform one or more of the following: serving streaming and/or downloaded audio-video sequences; caching annotation information determined for particular audio-video sequences at particular positions; and identifying sequences that at least partially overlap, and whose annotation information can be shared.

While various examples of the facility are described in terms of the environment outlined above, those skilled in the art will appreciate that the facility may be implemented in a variety of other environments including a single, monolithic computer system, as well as various other combinations of computer systems or similar devices connected in various ways. In various examples, a variety of computing systems or other different devices are used as clients, including desktop computer systems, laptop computer systems, automobile computer systems, tablet computer systems, smart phones, personal digital assistants, televisions, cameras, etc.

Figure 2:
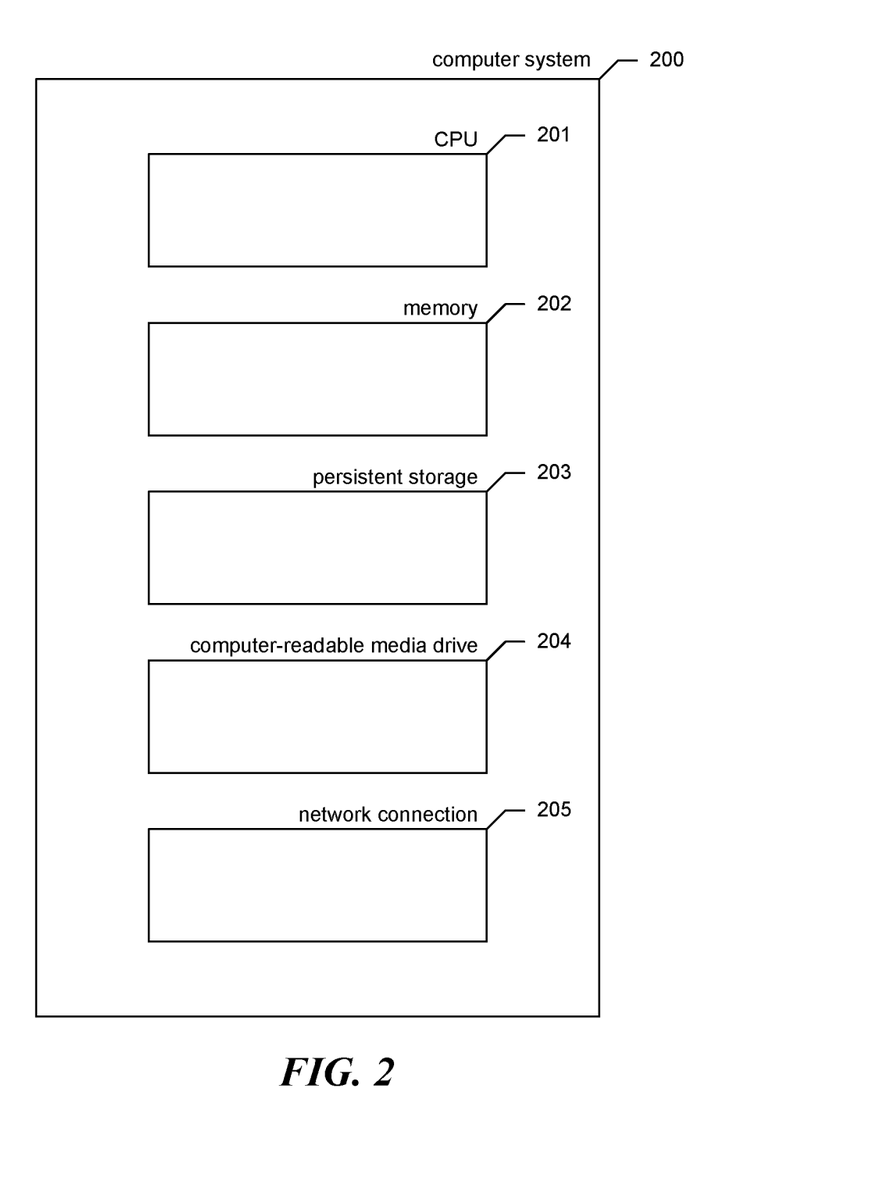
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various examples, these computer systems and other devices 200 can include server computer systems, desktop computer systems, laptop computer systems, netbooks, mobile phones, personal digital assistants, televisions, cameras, automobile computers, electronic media players, etc. In various examples, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3:
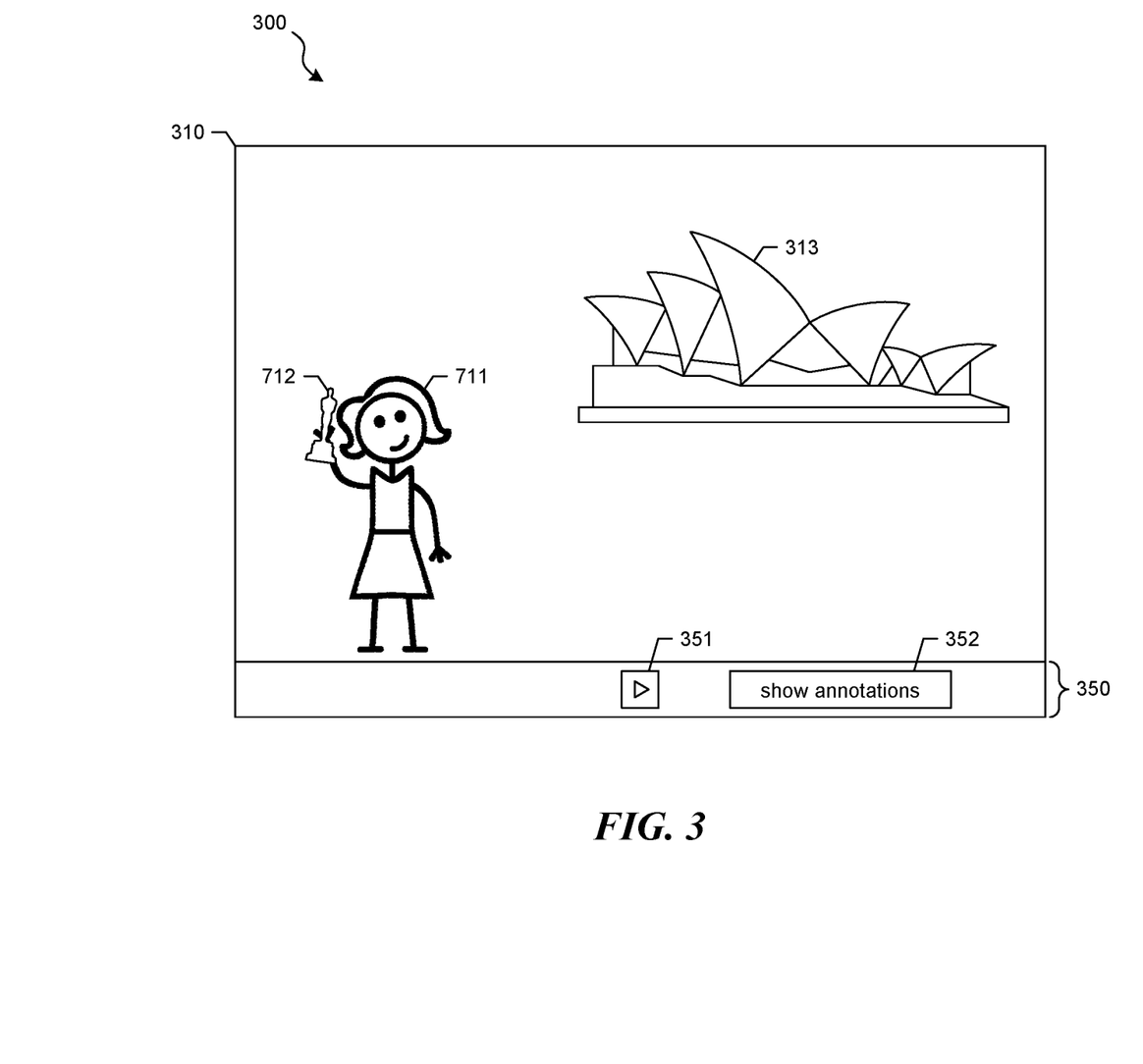
FIG. 3 is a display diagram showing a sample visual context in which the facility operates.

FIG. 3 is a display diagram showing a sample visual context in which the facility operates. The display 300 includes an audio-video sequence playback area 310. Shown in the playback area is a frame of the video component of a sequence being played back. The frame corresponds to a current playback position in the sequence. The frame shows a person 311 holding an object 312 in front of a building 313. Adjacent to the playback area is a control area 350. The control area includes a play or pause control 351 that the user can activate to pause, or play/resume the sequence. While the sequence is playing, the current position/time index advances. While the current position exit advances, new frames of the video component of the sequence corresponding to each new current position are displayed, and the audio component is rendered in a manner also synchronized with the advance of the playback position. In the form shown, the play or pause control indicates that playback is paused, and can be resumed by activating the play or pause control. The control area also includes an explicit show annotations control 352 that the user can activate in order to display annotations for the current playback position. In some examples, the user can also or instead activate the player pause control to pause playback to display annotations for the current playback position.

Figure 4:
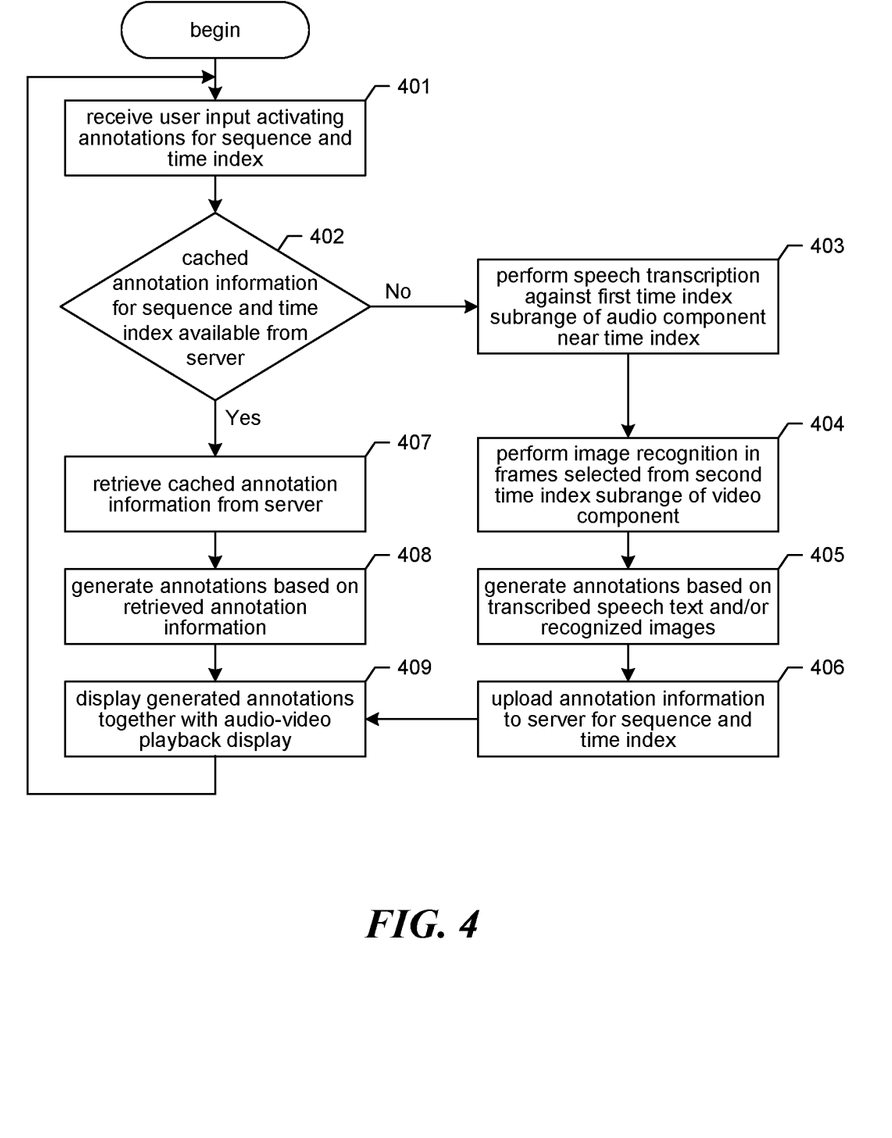
FIG. 4 is a flow diagram showing a process performed by the facility in some examples to annotate a position in a sequence.

FIG. 4 is a flow diagram showing a process performed by the facility in some examples to annotate a position in a sequence. At 401, the facility receives user input activating annotations for a particular sequence and time index in that sequence, such as the current playback position in a sequence being played back. As noted above, in various examples, the received user input can take various forms, such as user input pausing playback; user input explicitly requesting annotations; etc. At 402, if cached annotation information for the sequence and time index are available from an annotation caching server, then the facility continues at 407, else the facility continues at 403. In some examples, in response to retrieving the sequence or beginning its playback, the facility checks with the annotation caching server to identify all of the time indices in the time index range for the sequence for which the server is caching annotation information. In some examples, the facility waits until annotations are activated, and then at that point checks with the annotation caching server for the time index corresponding to the current playback position.

At 403, the facility performs speech transcription against a subrange of the audio component of the sequence near the time index, such as the 5 seconds of the audio component that end at the time index, the 10 seconds of the audio component that end at the time index, the 15 seconds of the audio component the end of the time index, etc. In some cases, this subrange extends past the time index by at least a few seconds. Performing the speech transcription results in transcribed text strings for each of one or more speakers who speech is heard in the subrange of the audio component. At 404, the facility performs image recognition in frames selected from a subrange of the video component of the sequence near the time index, such as the 5 seconds of the audio component that end at the time index, the 10 seconds of the audio component that end at the time index, the 15 seconds of the audio component the end of the time index, etc. In some cases, this subrange extends past the time index by at least a few seconds. Performing the image recognition results in information identifying one or more visual objects present among the selected frames, such as information identifying people ("Cate Blanchett") unique locations ("Sydney Opera Hall"), categorical locations ("a dense forest"), unique physical objects ("The Mona Lisa"), categorical physical objects ("a basketball"), etc. At 405, the facility generates annotations based upon the speech text transcribed at 403 and/or the images recognized at 404. In some examples, this involves performing one or more web searches using queries constructed from some or all of the text produced by the speech transcription and image recognition. Examples of generated annotations are shown and discussed below in connection with FIG. 8. At 406, the facility uploads annotation information relating to the annotations generated at 405 to an annotation caching server for the sequence being played back and the time index corresponding to its current playback position.

Figure 5:
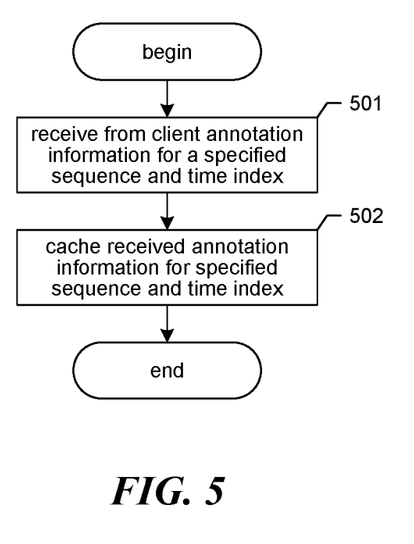
FIG. 5 is a flow diagram showing a process performed by the facility in some examples to receive annotation information in an annotation caching server.

FIG. 5 is a flow diagram showing a process performed by the facility in some examples to receive annotation information in an annotation caching server. At 501, the facility receives from a client annotation information for a sequence and time index specified by the client. At 502, the facility caches the received annotation information for the specified sequence and time index. After 502, this process concludes.

Those skilled in the art will appreciate that the acts shown in FIG. 5 and in each of the flow diagrams discussed herein may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 6:
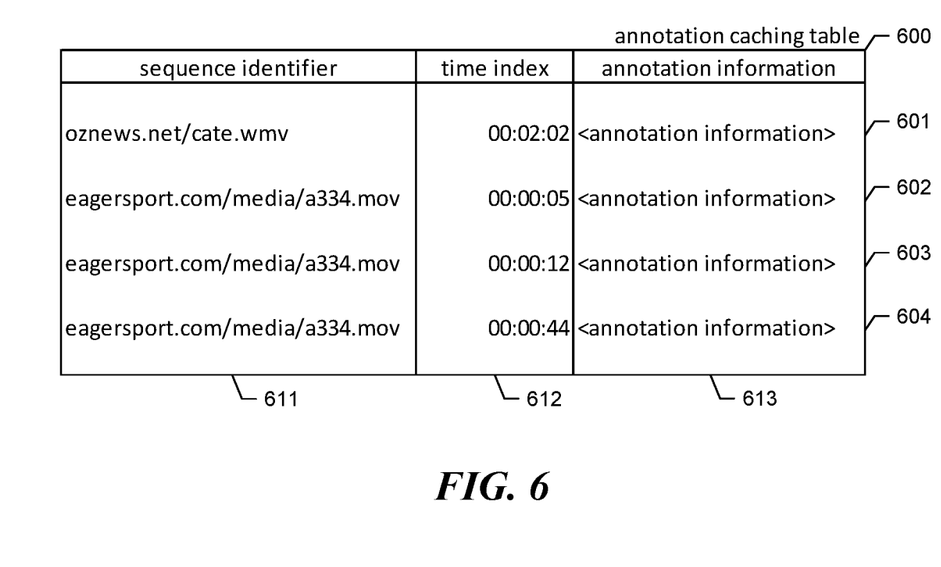
FIG. 6 is a table diagram showing sample contents of an annotation caching table used by the facility in some examples.

FIG. 6 is a table diagram showing sample contents of an annotation caching table used by the facility in some examples. The table 600 is made up of rows, such as rows 601-604, each corresponding to a different combination of audio-video sequence identity and time index. Each row is divided into the following columns: a sequence identifier column 611 containing an identifier usable to identify the audio-video sequence to which the row relates—as noted above, this may be a URL (as shown), an identifier assigned by a particular sequence serving service, an identifier stored among header information for the sequence, etc.; a time index column 612 identifying a time index to which the row relates; and an annotation information column 613 containing annotation information sent to the caching server by a client that generated annotations for the identified sequence at the identified time index. For example, row 601 indicates that the annotation information at the intersection of row 601 with column 613 was submitted by client for the sequence identified by sequence identifier "oznews.net/cate.wmv" at time index 00:02:02. In some examples, the annotation information contained in the annotation information column is the actual content of the annotations generated by the client. In some examples, the annotation information is intermediate information used by the client in the generation of the annotation content, such as: transcribed speech text; information identifying visual objects recognized; web search queries generated and submitted; web search results received; web contents retrieved on the basis of web search results; etc. In some examples (not shown), the annotation caching table can include multiple rows each having the same sequence identifier and time index, such that: different pieces or types of annotation information from the same client are distributed across multiple rows; annotation information from different clients are discouraged distributed across multiple rows; etc.

While FIG. 6 and each of the other table diagrams discussed herein show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

Returning to FIG. 4, after 406, the facility continues at 409. At 409, the facility displays the generated annotations together with the audio-video playback display. After 409, the facility continues at 401 to await the next annotations activation.

Figure 7:
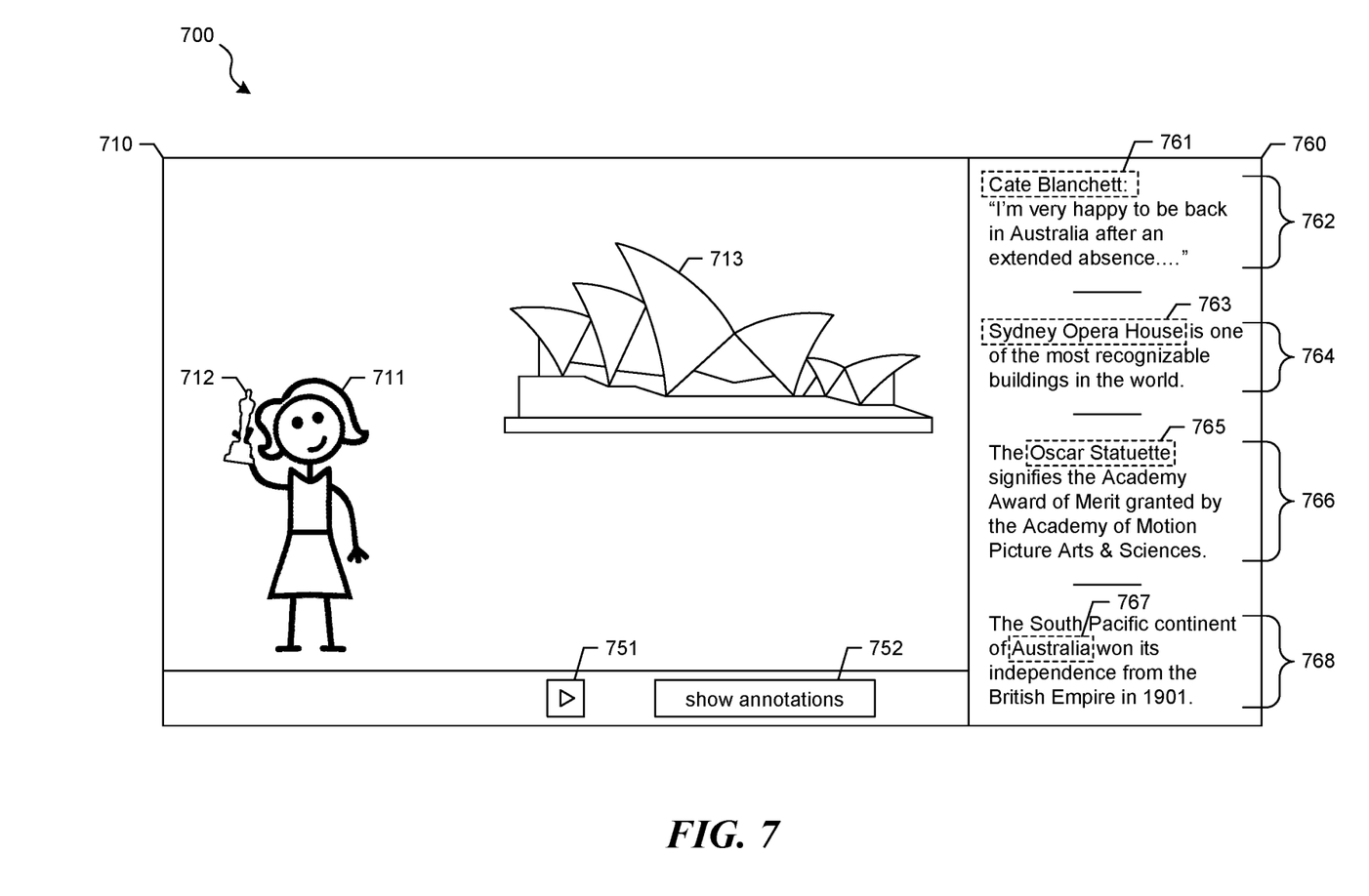
FIG. 7 is a display diagram showing sample annotations displayed by the facility in some examples.

FIG. 7 is a display diagram showing sample annotations displayed by the facility in some examples. In particular, FIG. 7 shows the addition of annotations to the sequence playback scenario shown in FIG. 3. It can be seen that, in display 700 of FIG. 7, the facility has added annotation area 760 adjacent to playback area 710. The annotations shown in the annotation area include transcribed speech 762, and an identification 761 of the corresponding speaker, Cate Blanchett. In some examples, the facility identifies the speaker using image recognition against person 711; in other examples, the facility identifies the speaker based upon recognizing the sound of the speakers voice; in various examples, in identifying the speaker, the facility uses additional contextual information associated with the sequence, such as the title of the sequence, people explicitly tagged in the sequence, a geographic location determined for the sequence, etc. The shown annotations also include the name 763 and a description 764 of the building 713 shown in the background of the displayed frame of the video component. The shown annotations also include the name 765 and a description 766 of held object 712. The shown annotations also include the name 767 and a description 768 of the country named in the transcribed text, "Australia." Those skilled in the art will appreciate that annotations of a variety of other types may be similarly generated and displayed by the facility.

Returning to FIG. 4, at 407, where cached annotation information for the sequence and time index are available from the annotation caching server, the facility retrieves the cached annotation information from the server by sending a request for annotation information to the server.

Figure 8:
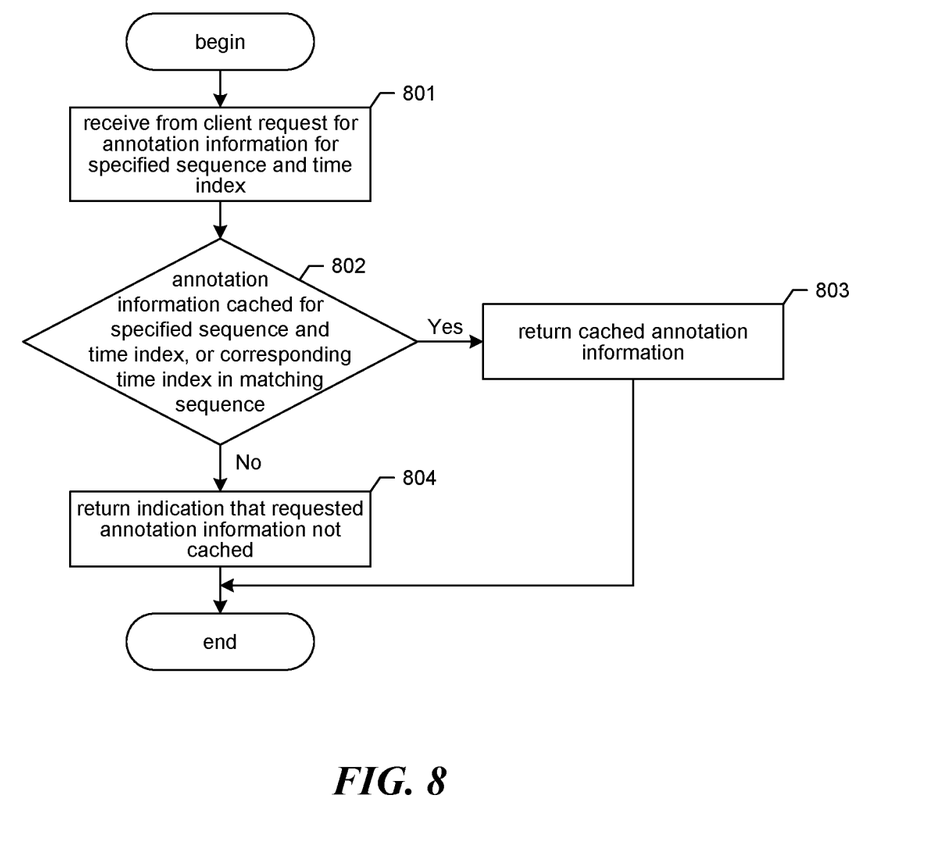
FIG. 8 is a flow diagram showing a process performed by the facility in some examples to receive a request for annotation information in an annotation caching server.

FIG. 8 is a flow diagram showing a process performed by the facility in some examples to receive a request for annotation information in an annotation caching server. At 801, the facility receives from a client a request for annotation information. The request specifies a particular sequence and time index within the sequence. At 802, if annotation information is cached in the server for the sequence and time index specified by the request, then the facility continues at 803, else the facility continues 804. Also, if annotation information is cached in the server for a corresponding time index in a sequence matching the specified sequence, the facility also continues at 803. At 803, the facility returns to the client from which the request was received the cached annotation information identified at 802. After 803, this process concludes. At 804, where the server is not caching annotation information for the specified sequence and time index, nor for a corresponding time indexed in any matching sequence, the facility returns an indication to the client from which the request was received that the requested annotation information is not cached. After 804, these steps conclude.

Returning to FIG. 4, at 408, the facility generates annotations based upon the annotation information in retrieved from the server at 407. After 408, the facility continues at 409 to display the generated annotations, as described above.

Figure 9:
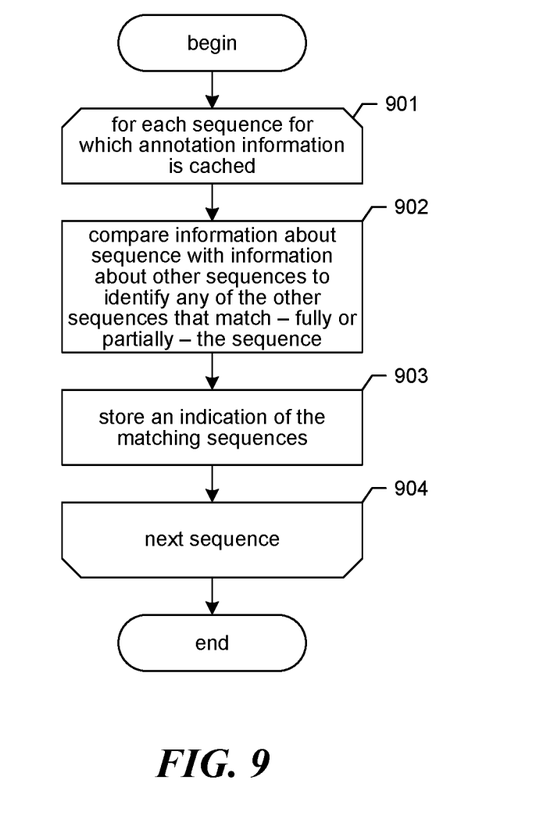
FIG. 9 is a flow diagram showing a process performed by the facility in some examples to identify matching sequences across which annotation information can be shared, such as in an annotation caching server.

FIG. 9 is a flow diagram showing a process performed by the facility in some examples to identify matching sequences across which annotation information can be shared, such as in an annotation caching server. At 901-904, the loop facility loops through each sequence for which annotation information is cached. At 902, the facility compares information about the sequence with information about other sequences to identify any of the other sequences that match the sequence, either fully or partially. In various examples, this comparison finds sequences that (a) are identical; (b) partially intersect; or (c) are different versions of the same audio and visual events, such as sequences at different bitrates produced from the same audio and video capture; separate captures by multiple devices in the same place at the same time; etc. In various examples, the facility identifies related sequences in one or more different ways, including, for example, by directly comparing audio sequences, directly comparing video sequences, comparing hashes or other significant compressions of audio sequences and/or video sequences, etc.; comparing the annotations cached for different sequences, summaries or otherwise compressed versions of these, or intermediate results used to arrive at these; etc. At 903, the facility stores an indication of the matching sequences identified at 902. At 904, if additional sequences remain to be processed, than the facility continues at 901 to process the next sequence, else this process concludes.

Figure 10:
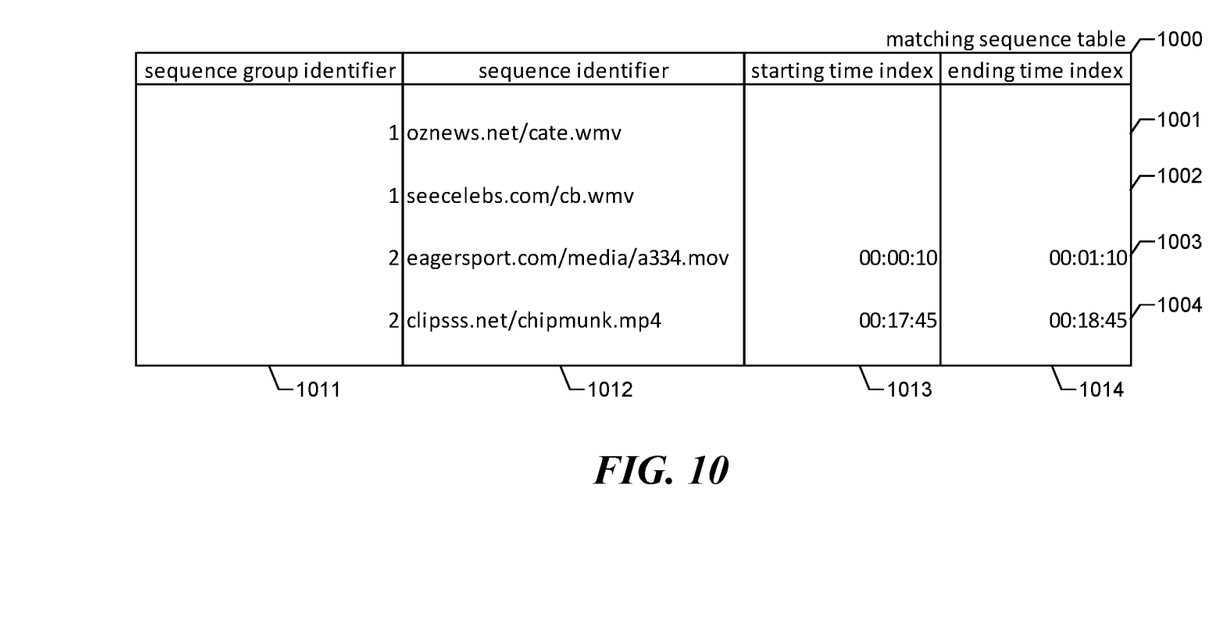
FIG. 10 is a table diagram showing sample contents of a matching sequence table used by the facility in some examples to store indications that two or more sequences match for the purpose of sharing annotation information across these matching sequences.

FIG. 10 is a table diagram showing sample contents of a matching sequence table used by the facility in some examples to store indications that two or more sequences match for the purpose of sharing annotation information across these matching sequences. The matching sequence table 1000 is made up of rows, such as rows 1001-1004, each corresponding to a particular time index of a particular sequence. Each row is divided into the following columns: a sequence group identifier column 1111 containing an identifier that is shared among rows of the table that correspond to a particular group of matching sequences; a sequence identifier column 1012 containing an identifier for the sequence to which the row relates; and a starting time index 1013 and ending time index column 1014—in sequence groups in which all the sequences do not entirely match, these columns specify the time index subrange of each sequence that matches the other sequences in the group. For example, rows 1001 and 1002, which have the sequence group identifier 1 in common, together indicate that the entire sequence at "oznews.net/cate.wmv" matches the entire sequence at "seecelebs.com/cb.wmv"; as a result, annotation information at any time index can be shared from the first of these to the second, or from the second to the first. As another example, rows 1003 and 1004, which have the sequence group identifier to in common, together indicate that the portion of the sequence at "eagersport.com/media/a334.mov" from time index 00:00:10 to time index 00:01:10 matches the portion of the sequence at "clipsss.net/chipmunk.mp4" from time index 00:17:45 to time index 00:18:45. Thus, where a client makes a request for "eagersport.com/media/a334.mov" at time index 00:00:45, the server can return annotation information cached for "clipsss.net/chipmunk.mp4" at time index 00:18:10 (or vice versa). On the other hand, where a client makes a request for "eagersport.com/media/a334.mov" at time index 00:00:05, no annotation information cached for"clipsss.net/chipmunk.mp4" can be returned. While not shown, any number of rows can have the same sequence group identifier, permitting annotation information to be shared across any number of fully or partially matching sequences.

In some examples, the facility provides a method in a computing system for augmenting an audio-video sequence playback display with respect to a current playback position of the audio-video sequence within a time index range of the audio-video sequence, the audio-video sequence having an audio component and a video component, comprising: for at least a first portion of the time index range of the audio-video sequence containing the current playback position, performing automatic voice transcription against the audio component to obtain speech text for at least one speaker; for at least a second portion of the time index range of the audio-video sequence containing the current playback position, performing automatic image recognition against the video component to obtain identifying information identifying at least one person, object, or location; and simultaneously with the audio-video sequence playback display and proximate to the audio-video sequence playback display, displaying one or more annotations each based upon (a) at least a portion of the obtained speech text, (b) at least a portion of the obtained identifying information, or (c) at least a portion of the obtained speech text and at least a portion of the obtained identifying information.

In some examples, the facility provides one or more memories collectively having contents configured to cause a computing system to perform a method for augmenting an audio-video sequence playback display with respect to a current playback position of the audio-video sequence within a time index range of the audio-video sequence, the audio-video sequence having an audio component and a video component, the method comprising: for at least a first portion of the time index range of the audio-video sequence containing the current playback position, performing automatic voice transcription against the audio component to obtain speech text for at least one speaker; for at least a second portion of the time index range of the audio-video sequence containing the current playback position, performing automatic image recognition against the video component to obtain identifying information identifying at least one person, object, or location; and simultaneously with the audio-video sequence playback display and proximate to the audio-video sequence playback display, displaying one or more annotations each based upon (a) at least a portion of the obtained speech text, (b) at least a portion of the obtained identifying information, or (c) at least a portion of the obtained speech text and at least a portion of the obtained identifying information.

In some examples, the facility provides a computing system for providing a web page annotation user interface, the computing system comprising: at least one processor; and memory having contents whose execution by the at least one processor causes the computing system to perform a method for augmenting an audio-video sequence playback display with respect to a current playback position of the audio-video sequence within a time index range of the audio-video sequence, the audio-video sequence having an audio component and a video component, the method comprising: for at least a first portion of the time index range of the audio-video sequence containing the current playback position, performing automatic voice transcription against the audio component to obtain speech text for at least one speaker; for at least a second portion of the time index range of the audio-video sequence containing the current playback position, performing automatic image recognition against the video component to obtain identifying information identifying at least one person, object, or location; and simultaneously with the audio-video sequence playback display and proximate to the audio-video sequence playback display, displaying one or more annotations each based upon (a) at least a portion of the obtained speech text, (b) at least a portion of the obtained identifying information, or (c) at least a portion of the obtained speech text and at least a portion of the obtained identifying information.

In some examples, the facility provides one or more memories collectively having contents configured to cause a computing system to perform a method for caching annotation information for particular positions in audio-video sequences, the method comprising: receiving a plurality of caching requests, each caching request from one of the plurality of clients, each caching request identifying an audio-video sequence, identifying a position in the identified audio-video sequence, and including information relating to annotations generated for the identified position in the identified audio-video sequence; for each of at least a portion of the received caching requests, storing the information included in the received caching request in a manner that enables its access using the identities of the audio-video sequence and the position identified by the caching request; receiving a plurality of cache access requests, each cache access request from one of the plurality of clients, each cache access request identifying an audio-video sequence and identifying a position in the identified audio-video sequence; and for each received cache access request, if information has been stored in connection with the audio-video sequence and the position identified by the cache access request, returning to the client originating the cache access request the information has been stored in connection with the audio-video sequence and the position identified by the cache access request.

In some examples, the facility provides a method in a computing system for caching annotation information for particular positions in audio-video sequences, the method comprising: receiving a plurality of caching requests, each caching request from one of the plurality of clients, each caching request identifying an audio-video sequence, identifying a position in the identified audio-video sequence, and including information relating to annotations generated for the identified position in the identified audio-video sequence; for each of at least a portion of the received caching requests, storing the information included in the received caching request in a manner that enables its access using the identities of the audio-video sequence and the position identified by the caching request; receiving a plurality of cache access requests, each cache access request from one of the plurality of clients, each cache access request identifying an audio-video sequence and identifying a position in the identified audio-video sequence; and for each received cache access request, if information has been stored in connection with the audio-video sequence and the position identified by the cache access request, returning to the client originating the cache access request the information has been stored in connection with the audio-video sequence and the position identified by the cache access request.

In some examples, the facility provides a computing system for providing a web page annotation user interface, the computing system comprising: at least one processor; and memory having contents whose execution by the at least one processor causes the computing system to perform a method for caching annotation information for particular positions in audio-video sequences, the method comprising: receiving a plurality of caching requests, each caching request from one of the plurality of clients, each caching request identifying an audio-video sequence, identifying a position in the identified audio-video sequence, and including information relating to annotations generated for the identified position in the identified audio-video sequence; for each of at least a portion of the received caching requests, storing the information included in the received caching request in a manner that enables its access using the identities of the audio-video sequence and the position identified by the caching request; receiving a plurality of cache access requests, each cache access request from one of the plurality of clients, each cache access request identifying an audio-video sequence and identifying a position in the identified audio-video sequence; and for each received cache access request, if information has been stored in connection with the audio-video sequence and the position identified by the cache access request, returning to the client originating the cache access request the information has been stored in connection with the audio-video sequence and the position identified by the cache access request.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system for augmenting an audio-video sequence playback display with respect to a current playback position of the audio-video sequence within a time index range of the audio-video sequence, the audio-video sequence having an audio component and a video component, comprising:
   receiving a user input pausing playback of the audio-video sequence at the current playback position, and responsive to the user input, activating one or more annotations corresponding to the time index range of the audio-video sequence containing the current playback position;
   determining whether the one or more annotations are available from an annotation storage facility;
   responsive to determining that the one or more annotations are available from an annotation storage facility, obtaining from the annotation storage facility:
      speech text for at least one speaker corresponding for at least a first portion of the time index range of the audio-video sequence containing the current playback position; or
      information identifying at least one person, object, or location for at least a second portion of the time index range of the audio-video sequence containing the current playback position;
   responsive to determining that the one or more annotations are not available from an annotation storage facility:
      for at least a first portion of the time index range of the audio-video sequence containing the current playback position, performing automatic voice transcription against the audio component to obtain speech text for at least one speaker;
      for at least a second portion of the time index range of the audio-video sequence containing the current playback position, performing automatic image recognition against the video component to obtain identifying information identifying at least one person, object, or location; and
   simultaneously with the audio-video sequence playback display and proximate to the audio-video sequence playback display, causing to be displayed one or more annotations each based upon (a) at least a portion of the obtained speech text, (b) at least a portion of the obtained identifying information, or (c) at least a portion of the obtained speech text and at least a portion of the obtained identifying information.

2. The method of claim 1 wherein the annotations are displayed at a time when playback of the audio-video sequence is paused at a time index near the current playback position.

3. The method of claim 1 wherein the annotations are displayed at a time when playback of the audio-video sequence is active near the current playback position.

4. The method of claim 1 wherein a displayed annotation comprises at least a portion of the obtained speech text.

5. The method of claim 1 wherein a displayed annotation comprises a name, we use to refer to the person, object, or location identified by the identifying information.

6. The method of claim 1, further comprising:
   submitting a web search query based on (a) at least a portion of the obtained speech text, (b) at least a portion of the obtained identifying information, or (c) at least a portion of the obtained speech text and at least a portion of the obtained identifying information; and
   receiving a web search result in response to the submitted web search query, wherein a displayed annotation comprises information contained by the received web search result.

7. The method of claim 1, further comprising discerning from first portion of the time index range of the video component movement of a speaker's facial features, wherein the performed automatic voice transcription is based in part on the discerned movement.

8. The method of claim 1 wherein the automatic image recognition identifies a person, and wherein the automatic voice transcription is performed using a speaker-dependent speech model for a group of one or more people that includes the identified person.

9. The method of claim 1, further comprising sending to a server accessible to a plurality of clients an annotation caching request, the request including (a) information identifying the audio-video sequence; (b) information specifying the current playback position; and (c) information specifying at least a portion of the displayed annotations.

10. The method of claim 1, further comprising sending to a server accessible to a plurality of clients an annotation caching request, the request including (a) information identifying the audio-video sequence; (b) information specifying the current playback position; and (c) information used to generate at least a portion of the displayed annotations.

11. The method of claim 1, further comprising sending to a server accessible to a plurality of clients an annotation caching request, the request including (a) information identifying the audio-video sequence; (b) information specifying the current playback position; and (c) at least one search query used to generate at least a portion of the displayed annotations.

12. One or more memories collectively having contents configured to cause a computing system to perform a method for caching annotation information for particular positions in audio-video sequences, the method comprising:
   receiving a plurality of caching requests, each caching request from one of the plurality of clients, each caching request identifying an audio-video sequence, identifying a position in the identified audio-video sequence, and including information relating to annotations generated for the identified position in the identified audio-video sequence, the annotations comprising at least one of:
  speech text for at least one speaker determined by performing automatic voice transcription against an audio component of the identified audio-video sequence, or
  identifying information identifying at least one person, object, or location determined by performing automatic image recognition against a video component of the identified audio-video sequence;
for each of at least a portion of the received caching requests, storing the information included in the received caching request in a manner that enables its access using the identities of the audio-video sequence and the position identified by the caching request;
receiving a plurality of cache access requests, each cache access request from one of the plurality of clients, each cache access request identifying an audio-video sequence and identifying a position in the identified audio-video sequence; and
for each received cache access request, if information has been stored in connection with the audio-video sequence and the position identified by the cache access request, returning to the client originating the cache access request the information that has been stored in connection with the audio-video sequence and the position identified by the cache access request.

13. The memories of claim 12, the method further comprising:
  comparing information relating to the audio-video sequences for which information is cached to identify audio-video sequences that at least partially match; and
  for each group of two or more audio-video sequences that at least partially match, storing an indication that the audio-video sequences of the group at least partially match.

14. The memories of claim 13, the method further comprising:
  for each group of two or more audio-video sequences that at least partially match, storing an indication of the position ranges of the audio-video sequences that at least partially match.

15. The memories of claim 13, the method further comprising:
  for each received cache access request, if no information has been stored in connection with the audio-video sequence and the position identified by the cache access request:
    if information has been stored in connection with a distinguished audio-video sequence indicated to at least partially match the audio-video sequence identified by the cache access request at the position identified by the cache access request, returning to the client originating the cache access request the information has been stored in connection with the distinguished audio-video sequence and the position identified by the cache access request.

16. The memories of claim 13 wherein the comparing compares video frames from the video components of the audio-video sequences.

17. The memories of claim 13 wherein the comparing compares audio data from the audio components of the audio-video sequences.

18. The memories of claim 13 wherein the comparing compares information cached for the audio-video sequences at particular positions.

19. A computing system for providing a web page annotation user interface, the computing system comprising:
  at least one processor; and
  memory having contents whose execution by the at least one processor causes the computing system to perform a method for augmenting an audio-video sequence playback display with respect to a current playback position of the audio-video sequence within a time index range of the audio-video sequence, the audio-video sequence having an audio component and a video component, the method comprising:
  receiving a user input activating one or more annotations corresponding to the time index range of the audio-video sequence containing the current playback position;
  determining whether the one or more annotations are available from an annotation storage facility;
    responsive to determining that the one or more annotations are available from an annotation storage facility, obtaining from the annotation storage facility:
      speech text for at least one speaker corresponding for at least a first portion of the time index range of the audio-video sequence containing the current playback position; or
      information identifying at least one person, object, or location for at least a second portion of the time index range of the audio-video sequence containing the current playback position;
    responsive to determining that the one or more annotations are not available from an annotation storage facility:
      for at least a first portion of the time index range of the audio-video sequence containing the current playback position, performing automatic voice transcription against the audio component to obtain speech text for at least one speaker;
      for at least a second portion of the time index range of the audio-video sequence containing the current playback position, performing automatic image recognition against the video component to obtain identifying information identifying at least one person, object, or location; and
  simultaneously with the audio-video sequence playback display and proximate to the audio-video sequence playback display, causing to be displayed one or more annotations each based upon (a) at least a portion of the obtained speech text, (b) at least a portion of the obtained identifying information, or (c) at least a portion of the obtained speech text and at least a portion of the obtained identifying information.

* * * * *